US011375507B2

(12) United States Patent
Ryu et al.

(10) Patent No.: US 11,375,507 B2
(45) Date of Patent: Jun. 28, 2022

(54) DECOUPLED UPLINK/DOWNLINK INITIAL ACCESS

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 16/515,807

(22) Filed: Jul. 18, 2019

(65) Prior Publication Data

US 2020/0029320 A1 Jan. 23, 2020

Related U.S. Application Data

(60) Provisional application No. 62/700,616, filed on Jul. 19, 2018.

(51) Int. Cl.
*H04W 72/04* (2009.01)
*H04W 74/08* (2009.01)
(Continued)

(52) U.S. Cl.
CPC ........ *H04W 72/046* (2013.01); *H04B 7/0695* (2013.01); *H04B 7/088* (2013.01); *H04W 74/0833* (2013.01)

(58) Field of Classification Search
CPC combination set(s) only.
See application file for complete search history.

(56) References Cited

U.S. PATENT DOCUMENTS 10,812,125 B1 * 10/2020 Badic .................. H04B 7/0814
2012/0320874 A1 * 12/2012 Li ......................... H04W 48/12 370/328

(Continued)

FOREIGN PATENT DOCUMENTS

EP 3168999 A1 5/2017
WO WO-2016086144 A1 * 6/2016 ........... H04W 24/08

(Continued)

OTHER PUBLICATIONS

HUAWEI et al., "Beam Failure Recovery Design Details", 3GPP Draft; R1-1715468, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051338936, Retrieved from the Internet: URL:http://www.3gpp.org/ftp/Meetings_3GPP_SYNC/RAN1/Docs/ [retrieved on Sep. 17, 2017], 10 pages.

(Continued)

*Primary Examiner* — Yee F Lam
(74) *Attorney, Agent, or Firm* — Arent Fox, LLP

(57) ABSTRACT

Methods, apparatuses, and computer-readable mediums for wireless communication are disclosed by the present disclosure. In an example, a user equipment (UE) communicates with a base station on different uplink (UL) and downlink (DL) beam paths. In the example, the UE may indicate to the base station a preferred beam path to use. The UE may indicate the preferred beam path in response to an explicit request from the base station or without an explicit request. The use of different UL/DL beam paths allow beam paths which avoid interference from a user of the UE to be used.

18 Claims, 9 Drawing Sheets

400

402 Receiving two or more synch signals from a base station

404 Determining a preferred UL beam for transmitting a preamble to the base station 406 Transmitting the preamble to the base station on the preferred UL beam 408 Receiving, from the base station via a first DL beam, a request for an indication of the preferred DL beam 410 Determining a preferred DL beam for the UE to communicate with a base station 412 Transmitting the indication of the preferred DL beam to the base station 414 Receiving, in response to the indication being received by the base station, a message from the base station on the preferred DL beam

(51) Int. Cl.
*H04B 7/06* (2006.01)
*H04B 7/08* (2006.01)

(56) References Cited

U.S. PATENT DOCUMENTS

| | | | | |
|---|---|---|---|---|
| 2014/0177607 | A1* | 6/2014 | Li | H04B 7/0695 370/336 |
| 2015/0382205 | A1* | 12/2015 | Lee | H04B 7/0417 370/329 |
| 2016/0134352 | A1* | 5/2016 | Stirling-Gallacher | H04B 7/0639 370/329 |
| 2016/0157267 | A1* | 6/2016 | Frenne | H04W 72/046 370/329 |
| 2017/0251460 | A1* | 8/2017 | Agiwal | H04W 72/0406 |
| 2019/0104549 | A1* | 4/2019 | Deng | H04B 7/0617 |
| 2020/0145090 | A1* | 5/2020 | Sun | H04W 72/042 |

FOREIGN PATENT DOCUMENTS

| | | | |
|---|---|---|---|
| WO | 2017088898 | A1 | 6/2017 |
| WO | 2018098826 | A1 | 6/2018 |

OTHER PUBLICATIONS

International Search Report and Written Opinion—PCT/US2019/042683—ISA/EPO—dated Oct. 14, 2019.

* cited by examiner

DECOUPLED UPLINK/DOWNLINK INITIAL ACCESS

CROSS-REFERENCE TO RELATED APPLICATION

This application claims the benefit of U.S. Provisional Application Ser. No. 62/700,616, entitled "DECOUPLED UPLINK/DOWNLINK INITIAL ACCESS" and filed on Jul. 19, 2018, which is expressly incorporated by reference herein in its entirety.

BACKGROUND

The present disclosure relates generally to communication systems, and more particularly, to decoupled Uplink (UL)/Downlink (DL) initial access.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, for NR communications technology and beyond, current line of sight requirements may result in issues from radiation exposure when a user of a user equipment (UE) is located within a UL/DL beam path. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communications are disclosed by the present disclosure. In an aspect, a method of wireless communications by a user equipment (UE) is described. The method may include receiving, from a base station via a first downlink (DL) beam, a request for an indication of a preferred DL beam for the UE to communicate with the base station. The method may also include determining the preferred DL beam for the UE to communicate with the base station, wherein the preferred DL beam is different from the first DL beam. The method may also include transmitting the indication of the preferred DL beam to the base station.

In another aspect, a UE is described. The UE may include a memory configured to store instructions and a processor configured to execute the instructions. The processor may be configured to receive, from a base station via a first downlink (DL) beam, a request for an indication of a preferred DL beam for the UE to communicate with the base station. The processor may also be configured to determine the preferred DL beam for the UE to communicate with the base station, wherein the preferred DL beam is different from the first DL beam. The processor may also be configured to transmit the indication of the preferred DL beam to the base station.

In another aspect, an apparatus is described. The apparatus may include means for receiving, from a base station via a first downlink (DL) beam, a request for an indication of a preferred DL beam for the UE to communicate with the base station. The apparatus may also include means for determining the preferred DL beam for the UE to communicate with the base station, wherein the preferred DL beam is different from the first DL beam. The apparatus may also include means for transmitting the indication of the preferred DL beam to the base station.

In another aspect, a computer-readable medium storing computer executable code executable by a processor of a UE, is described. The computer-readable medium may include code to receive, from a base station via a first downlink (DL) beam, a request for an indication of a preferred DL beam for the UE to communicate with the base station. The computer-readable medium may also include code to determine the preferred DL beam for the UE to communicate with the base station, wherein the preferred DL beam is different from the first DL beam. The computer-readable medium may also include code to transmit the indication of the preferred DL beam to the base station.

In another aspect, a method of wireless communications by a base station is described. The method may include transmitting, to a UE via a first DL beam, a request for an indication of a preferred DL beam of the UE. The method may also include receiving the indication of the preferred DL beam from the UE in response to the request. The method may also include determining the preferred DL beam for communicating with the UE based on the indication, wherein the first DL beam is different from the preferred DL beam. The method may further include transmitting, in response to receiving the indication, a message via the preferred DL beam to the UE.

In another aspect, a base station is described. The base station may include a memory configured to store instructions and a processor configured to execute the instructions. The processor may be configured to transmit, to a UE via a first DL beam, a request for an indication of a preferred DL beam of the UE. The processor may also be configured to receive the indication of the preferred DL beam from the UE in response to the request. The processor may also be configured to determine the preferred DL beam for communicating with the UE based on the indication, wherein the first DL beam is different from the preferred DL beam. The processor may also be configured to transmit, in response to receiving the indication, a message via the preferred DL beam to the UE.

In another aspect, an apparatus is described. The apparatus may include means for transmitting, to a UE via a first DL beam, a request for an indication of a preferred DL beam of the UE. The apparatus may also include means for the indication of the preferred DL beam from the UE in response to the request. The apparatus may also include means for determining the preferred DL beam for communicating with the UE based on the indication, wherein the first DL beam is different from the preferred DL beam. The apparatus may also include means for transmitting, in response to receiving the indication, a message via the preferred DL beam to the UE.

In another aspect, a computer-readable medium storing computer executable code executable by a processor of a base station, is described. The computer-readable medium may include code to transmit, to a UE via a first DL beam, a request for an indication of a preferred DL beam of the UE. The computer-readable medium may also include code to receive the indication of the preferred DL beam from the UE in response to the request. The computer-readable medium may also include code to determine the preferred DL beam for communicating with the UE based on the indication, wherein the first DL beam is different from the preferred DL beam. The computer-readable medium may also include code to transmit, in response to receiving the indication, a message via the preferred DL beam to the UE.

In another aspect, a method of wireless communications by a user equipment (UE) is described. The method may include determining a preferred uplink (UL) beam and a preferred DL beam for the UE to communicate with a base station, wherein the preferred UL beam is different from the preferred DL beam. The method may also include selecting a preamble corresponding to the preferred DL beam. The method may further include transmitting, via the preferred UL beam, the preamble to the base station as an indication of the preferred DL beam.

In another aspect, a UE is described. The UE may include a memory configured to store instructions and a processor configured to execute the instructions. The processor may be configured to determine a preferred UL beam and a preferred DL beam for the UE to communicate with a base station, wherein the preferred UL beam is different from the preferred DL beam. The processor may also be configured to select a preamble corresponding to the preferred DL beam. The processor may also be configured to transmit, via the preferred UL beam, the preamble to the base station as an indication of the preferred DL beam.

In another aspect, an apparatus is described. The apparatus may include means for determining a preferred UL beam and a preferred DL beam for the apparatus to communicate with a base station, wherein the preferred UL beam is different from the preferred DL beam. The apparatus may also include means for selecting a preamble corresponding to the preferred DL beam. The apparatus may also include means for transmitting, via the preferred UL beam, the preamble to the base station as an indication of the preferred DL beam.

In another aspect, a computer-readable medium storing computer executable code executable by a processor of a UE, is described. The computer-readable medium may include code to determine a preferred UL beam and a preferred DL beam for the UE to communicate with a base station, wherein the preferred UL beam is different from the preferred DL beam. The computer-readable medium may also include code to select a preamble corresponding to the preferred DL beam. The computer-readable medium may also include code to transmit, via the preferred UL beam, the preamble to the base station as an indication of the preferred DL beam.

In another aspect, a method of wireless communications by a base station is described. The method may include receiving, from a UE via a UL beam, a preamble indicating a preferred DL beam, wherein the UL beam is different from the preferred DL beam. The method may also include determining to transmit a response to receiving the preamble via the preferred DL beam based on the preamble. The method may further include transmitting a RAR via the preferred DL beam to the UE.

In another aspect, a base station is described. The base station may include a memory configured to store instructions and a processor configured to execute the instructions. The processor may be configured to receive, from a UE via a UL beam, a preamble indicating a preferred DL beam, wherein the UL beam is different from the preferred DL beam. The processor may also be configured to determine to transmit a response to receiving the preamble via the preferred DL beam based on the preamble. The processor may also be configured to transmit a RAR via the preferred DL beam to the UE.

In another aspect, an apparatus is described. The apparatus may include means for receiving, from a UE via a UL beam, a preamble indicating a preferred DL beam, wherein the UL beam is different from the preferred DL beam. The apparatus may also include means for determining to transmit a response to receiving the preamble via the preferred DL beam based on the preamble. The apparatus may also include means for transmitting a RAR via the preferred DL beam to the UE.

In another aspect, a computer-readable medium storing computer executable code executable by a processor of a base station, is described. The computer-readable medium may include code to receive, from a UE via a UL beam, a preamble indicating a preferred DL beam, wherein the UL beam is different from the preferred DL beam. The computer-readable medium may also include code to determine to transmit a response to receiving the preamble via the preferred DL beam based on the preamble. The computer-readable medium may also include code for transmitting a RAR via the preferred DL beam to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
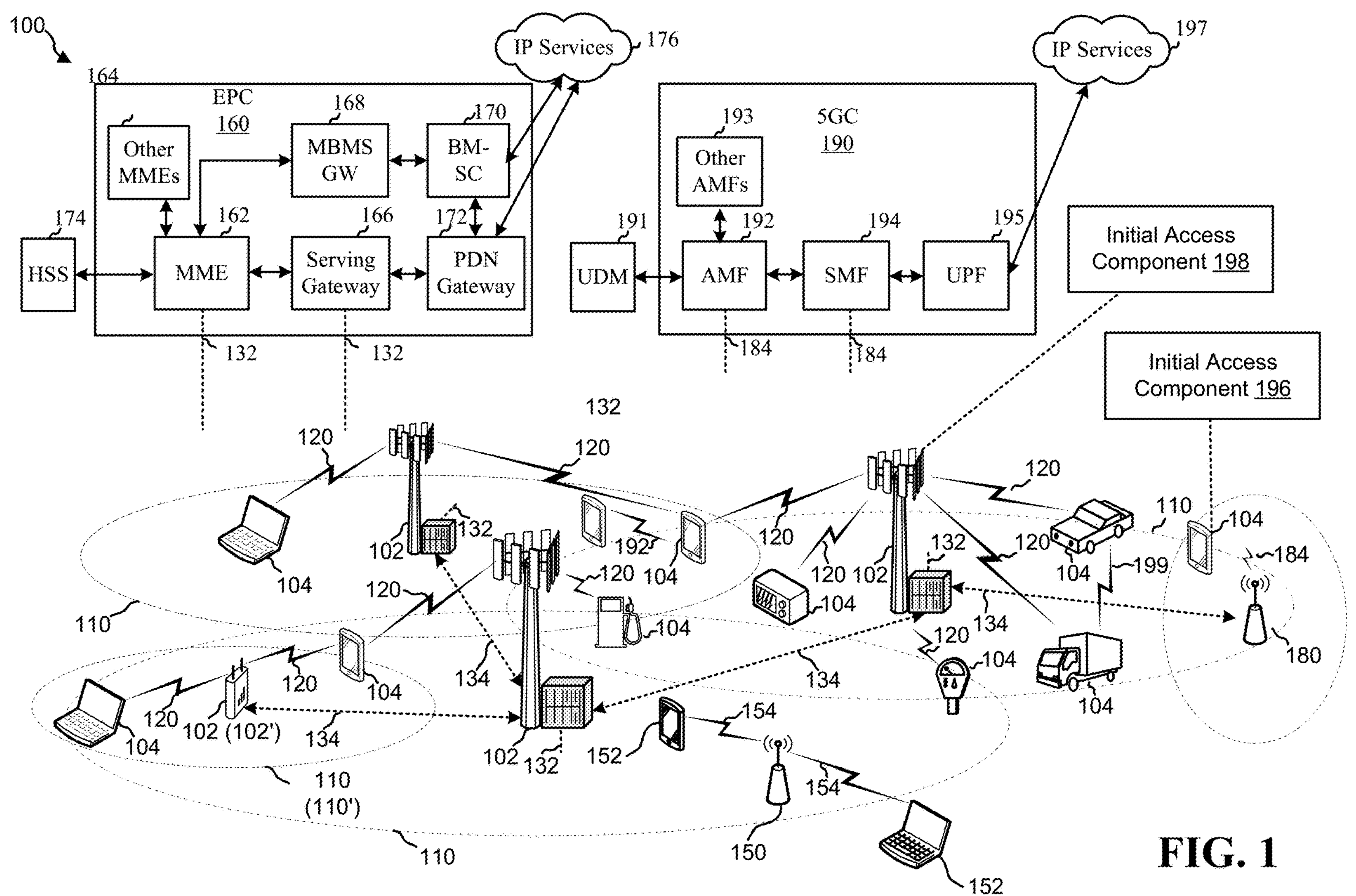
FIG. 1 is a schematic diagram of an example of a wireless communications system and an access network including initial access component for decoupled UL/DL initial access, as described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Methods, apparatuses, and computer-readable mediums for wireless communication are disclosed by the present disclosure. In an example, a user equipment (UE) communicates with a base station on different UL and DL beam paths. For example, as used herein, the term "beam" may refer to a directional transmission, and the term "beam path" may refer to a beam transmitted in a particular direction, e.g., on a particular beam path. In this implementation, the beams may be transmitted and/or received by a base station and/or a UE having a directional antenna system, such as a high-dimensional phased array antenna capable of beamforming or receiving directional beams, and having other beam management capabilities. In the example, the UE may indicate to the base station a preferred beam path to use. The UE may indicate the preferred beam path explicitly or implicitly. The use of a UL beam path that is different from a DL beam path allows the different beam paths to avoid interference, such as from the UE or from other neighboring UEs or base stations.

In other words, and more specifically, the present disclosure relates to an initial access process used to decouple UL beams and DL beams used for communication between a UE and a base station. Typically, a UE and base station communicate on corresponding UL and DL beams, e.g., a same beam path is used for both the UL and the DL. For example, the base station transmits a plurality of synch signals on a plurality of DL beams, each on one of a plurality of beam paths, and the UE receives one of the synch signals (e.g., one of the DL beams on one of the beam paths) and communicates with the base station on a corresponding (e.g., same direction) UL beam. However, due to interference issues, it may be beneficial for the UL beam(s) to be directionally decoupled from the DL beam(s) such that the UE and base station communicate on a DL beam and a non-corresponding UL beam, e.g., the two beams have different directions.

Accordingly, the present disclosure relates to methods, apparatus, and computer-readable mediums for signaling preferred beams for communication between a UE and a base station. In an example of a first implementation, operations are performed so the UE determines a preferred UL beam based on interference and transmits a preamble on the preferred UL beam via MSG1, and the base station explicitly requests a preferred DL beam and the UE transmits explicit feedback of the preferred DL beam via MSG3 of an initial access procedure. In an example of a second implementation, operations are performed so the UE determines a preferred UL beam based on interference, and the UE transmits an indication, without an explicit request from the base station, of a preferred DL beam on the preferred UL beam via MSG1 of an initial access procedure using a preamble frequency or preamble index to indicate the preferred DL beam.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system and an access network 100 including at least one user equipment (UE) 104, having an initial access component 196 configured to decouple uplink (UL)/downlink (DL) initial access, is illustrated. In an implementation, the initial access component 196 may be configured to receive from the base station 102, a request to send information corresponding to a preferred DL beam for the UE 104 to receive a message. The initial access component 196 may also be configured to determine the preferred DL beam for the UE 104 based on the request. The initial access component 196 may further be configured to transmit the information corresponding to the preferred DL beam to the base station 102. The initial access component 196 may also be configured to receive, in response to the information, the message on the preferred DL beam from the base station 102.

In another implementation, the initial access component 196 may be configured to determine a preferred DL beam for the UE 104 to receive a message from the base station 102. The initial access component 196 may also be configured to select a preamble corresponding to the preferred DL beam. The initial access component 196 may further be configured to transmit the preamble to the base station 102.

The access network 100 also includes at least one base station 102 having an initial access component 198 configured to decouple UL/DL initial access. In an implementation, the initial access component 198 is configured to transmit to the UE 104 a request to send information corresponding to a preferred DL beam for the UE 104 to receive a message. The initial access component 198 is configured to receive the information corresponding to the preferred DL beam from the UE 104 in response to the request. The initial access component 198 is configured to transmit, in response to the information, the message on the preferred DL beam to the UE 104.

In another implementation, the initial access component 198 is configured to receive, from the UE 104, a preamble. The initial access component 198 is also configured to assume the preamble was randomly selected by the UE 104. The initial access component 198 is further configured to transmit a Random Access Channel (RACH) Accept Response (RAR) on a first DL beam to the UE 104 in response to the preamble. The initial access component 198 is also configured to determine UL control information was not received from the UE 104 within a predetermined time. The initial access component 198 is further configured to determine a preferred DL beam different than the first DL beam to transmit the RAR based on the preamble. The initial access component 198 is also configured to transmit the RAR on the preferred DL beam to the UE 104.

The wireless communications system and access network 100 (also referred to as a wireless wide area network (WWAN)) may include any number of base stations 102 and UEs 104, which can communicate between themselves and with one another, and with an Evolved Packet Core (EPC) 160 and/or a 5G Core (5GC) 190. The base stations 102 may include macro cells (high power cellular base station) and/or small cells (low power cellular base station). The small cells may also be referred to as femtocells, picocells, or microcells. The base stations 102 may also be referred to as a gNodeB (gNB), Node B, evolved Node B (eNB), an access point, a base transceiver station, a radio base station, a radio transceiver, a transceiver function, a basic service set (BSS), an extended service set (ESS), or some other suitable terminology. Each of the base stations 102 provides an access point to the EPC 160 or 5GC 190 for the UEs 104.

The base stations 102 (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, or delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104 via communication links 120. Each of the base stations 102 may provide communication coverage for a respective geographic coverage area 110. There may be overlapping geographic coverage areas 110. For example, a small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include UL (also referred to as reverse link) transmissions from the UE 104 to the base station 102 and/or DL (also referred to as forward link) transmissions from the base station 102 to the UE 104. The communication links 120 may use multiple-input and multiple-output (MIMO) antenna technology, including spatial multiplexing, beamforming, and/or transmit diversity. The communication links 120 may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 199. The D2D communication link 199 may use the DL/UL WWAN spectrum. The D2D communication link 199 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). A D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNB 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 191. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 may provide UE IP address allocation as well as other functions. The UPF 195 may couple with IP Services 197. The IP Services 197 may include the Internet, an intranet, an IP Multimedia Subsystem (IMS), a PS Streaming Service, and/or other IP services.

Examples of the UEs 104 may include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
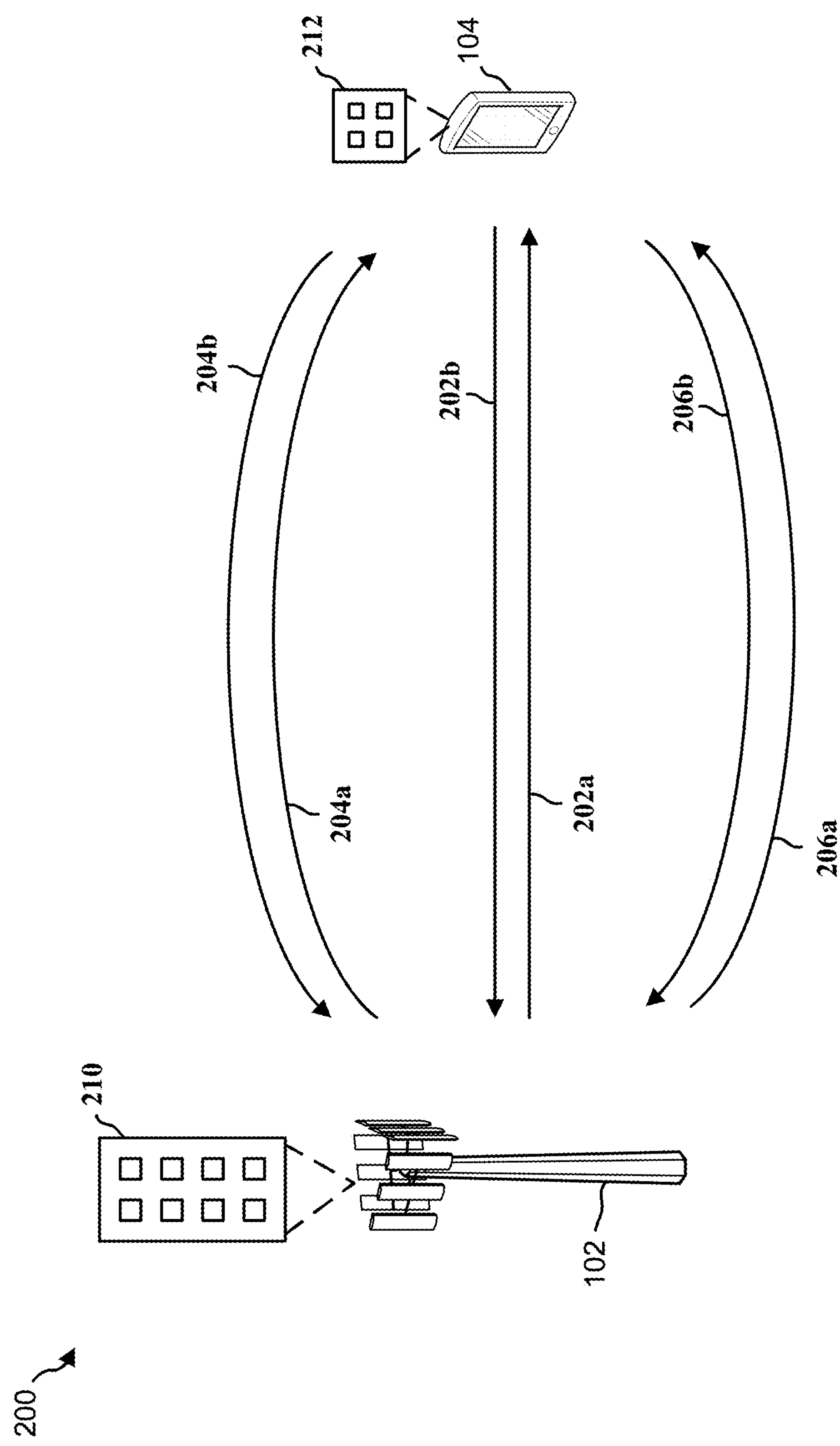
FIG. 2 is a block diagram of an example of beam forming according to aspects of the present application.

Referring to FIG. 2, an example of beam forming is illustrated. As described herein, beam forming may be used in mmW systems. To generate the beams, the base station 102 may include antenna arrays 210 (e.g., antenna arrays of 16×4, 32×4, 32×8, 64×4, 64×8, 128×16) to establish the mmW link. The antenna arrays 210 may give the base station 102 the ability to focus a tight/narrow beam (e.g., a beam with a narrow beam width) to the UE 104. The UE 104 may include an antenna array 212 to communicate with the base station 102. In the example, the base station 102 and the UE 104 may use directional beams **202*a*, 202*b*, 204*a*, 204*b*, 206*a*, and 206*b* to establish a mmW link. The directional beams 202*a*, 202*b*, 204*a*, 204*b*, 206*a*, and 206*b* may represent viable signal paths, e.g., beam paths, between the base station and the UE 104. The directional beams 202*a*, 202*b*, 204*a*, 204*b*, 206*a*, and 206*b* may focus transmit and receive energy along respective beam paths and directions. In some examples, the base station 102 may use the directional beams 202*a*, 204*a*, and 206*a* as DL beams to transmit data to the UE 104, and the UE 104 may use respectively corresponding direction beams 202*b*, 204*b*, and 206*b* as UL beams to transmit data to the base station 102**.

In a typical beam forming system, each DL beam has a corresponding UL beam which means the beam paths for a DL beam and a corresponding UL beam are the same or substantially similar. Typically a base station and a UE use one path to establish for a communication link. For example, as shown by FIG. 2, the beam path for DL beam **202*a* corresponds with the beam path for UL beam 202*b*, the beam path for DL beam 204*a* corresponds with the beam path for UL beam 204*b*, and the beam path for DL beam 206*a* corresponds with the beam path for UL beam 206*b***.

In a typical beam forming system, the UE 104 selects a best UL beam path (e.g., UL beam 202*b*) possible, for example, based on a highest received signal strength from among a plurality of received beams, to communicate with the base station 102. Consequently, after having received data on the particular UL beam path (e.g., UL beam 202*b*) from the UE 104, the base station 102 communicates with the UE 104 using the corresponding (e.g., same direction) DL beam path (e.g., DL beam 202*a*). Under normal conditions, use of the best beam path possible may be desirable to provide a strong beam for communication and to provide a simple implementation of communication between the base station 102 and the UE 104.

The implementation of the best beam path possible may not be desirable in all situations. In some examples as described in the present disclosure, communications between the base station 102 and the UE 104 may be determined to be on a less desirable, but viable, beam path due to interferences and/or Maximum Permissible Exposure (MPE) of radiation. For example, the UE 104 may determine to request use of a new beam path (e.g., DL beam 204*a*) for DL communications that differs from an initial beam path (e.g., UL beam 202*b*) the UE 104 used for an UL communication, e.g. transmitting a RACH preamble, for instance, due to a hand or other body part of a user of the UE 104 interfering with or blocking (e.g., being in the path of) the reception of UL communications on the initial beam path. In other words, if the best beam path propagates through a part of the body of the user and/or if the part of the body is too close to the UE antenna array 212, according to the present disclosure, the UE 104 and the base station 102 may select different beam paths for signaling on the DL versus on the UL even though using the different paths may result in a worse link gain. The present disclosure provides for this implementation, in contrast to current systems or methods that do not allow for informing the base station 102 to use a different beam paths for UL and DL communications with the UE 104.

In other words, in aspects of the present disclosure, the UE 104 may indicate to the base station 102 a preferred beam path for one or more of a DL communication or an UL communication, which may or may not be the best beam path possible and which may differ from a corresponding UL path or DL path, for communicating with the UE 104. In these aspects, UL/DL beam paths may be decoupled from one another, meaning the base station 102 and UE 104 may communicate on an UL beam path different from a DL beam path (e.g., non-corresponding, different directional beam paths). For example, the UE 104 may inform the base station 102 to use a different beam path for DL communications using an initial access process, such as a Random Access Channel (RACH) process, as described below.

Figure 3:
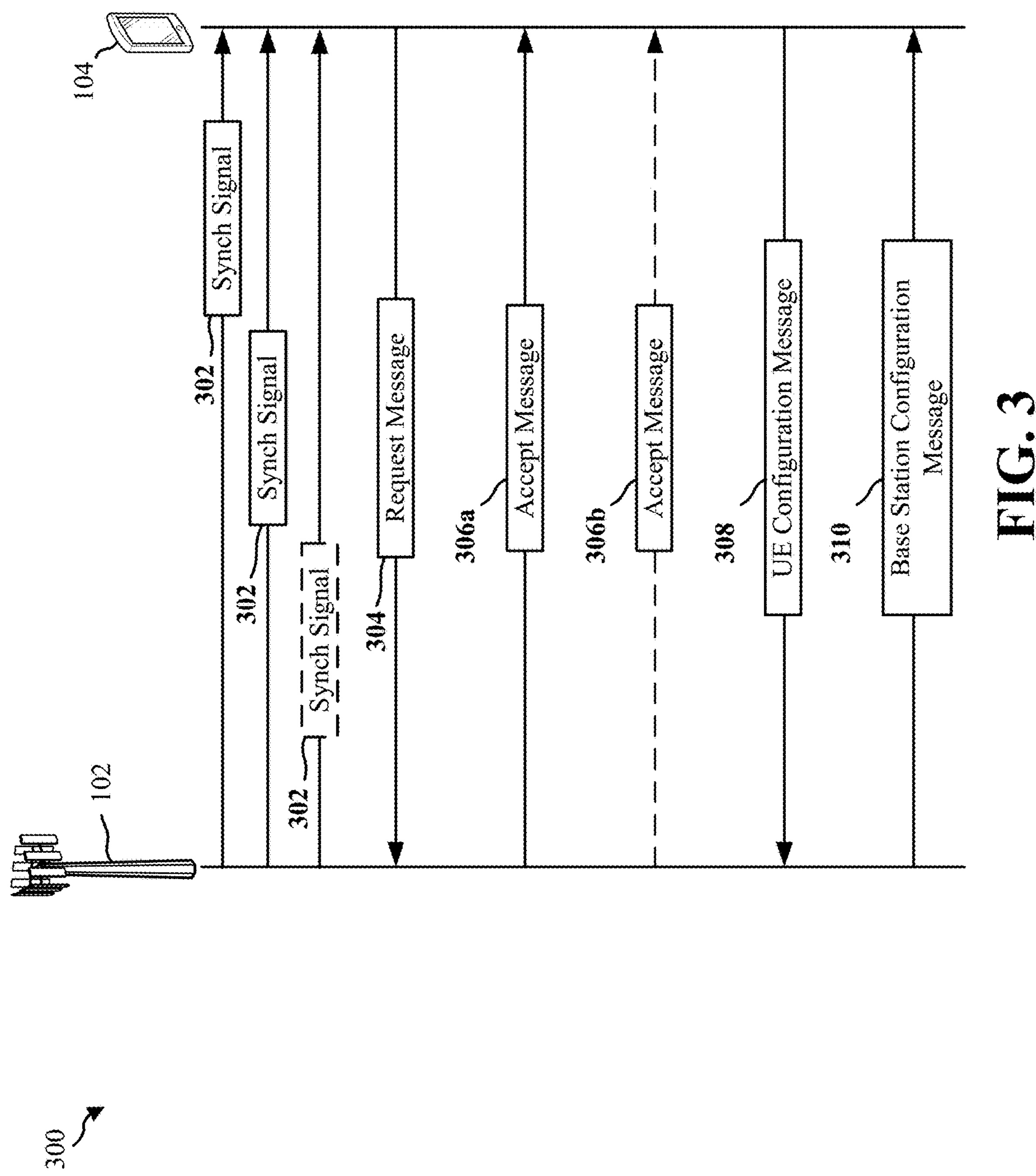
FIG. 3 is a schematic diagram of an example of initial access process according to aspects of the present application.

Referring to FIG. 3, an example of an initial access process 300 using decoupled UL/DL beam paths is illustrated. During the initial access process 300, the base station 102 may transmit multiple beams (e.g., DL beams 202*a*, 204*a*, and 206*a*) along different paths or different directions. The multiple beams may be synch (or synchronization) signals 302 which include synchronization information (e.g., connection time, frequency, beam, and channel, etc. associated with the base station 102) for connecting to the base station 102. In an example, the synchronization information may be RACH configuration information. The UE 104 may listen for synch signals and receive one or more of the synch signals 302 from the base station 102.

The UE 104 may determine to connect to the base station 102 based on the synchronization information of one of the synch signals 302. For example, the UE 104 may select one of the plurality of synch signals 302. As the plurality of synch signals 302 are directional, the selected synch signal 302 corresponds to a particular direction or a particular beam path different from other ones of the plurality of synch signals 302. The UE 104 may then transmit a request message 304 to the base station 102 on the same beam path or beam direction as the selected one of the synch signals 302. The request message 304 may include a request for the UE 104 to connect to the base station 102. In an example, the request message 304 may be a MSG1 or a RACH signal, and may include a preamble. The preamble may be one of a number (e.g., 64 preambles) of predetermined sequences that are known by both the UE 104 and the base station 102. The UE 104 may transmit the request message 304 based on the synchronization information. For example, the UE 104 may wait to transmit the request message 304 based on the connection time designated by the synchronization information from the synch signal 302. The request message 304 may indicate to the base station 102 that the UE 104 wants to connect with the base station 102. After transmitting the request message 304, the UE 104 then waits for a response from the base station 102.

In response to the request message 304, the base station 102 may determine to accept the connection request from the UE 104 and transmit one or more accept messages 306*a*, 306*b* to indicate the base station's 102 acceptance of the connection request. In an example, the accept messages 306*a*, 306*b* may be a MSG2 or a RAR. Based on one or more of the accept messages 306*a*, 306*b*, the UE 104 and the base station 102 may exchange a UE configuration message 308 (e.g., MSG3) and a base station configuration message 310 (e.g., MSG4), respectively, for configuring a link between the base station 102 and the UE 104.

During a typical initial access process, the base station 102 and the UE 104 perform the above operations using the same beam paths for UL/DL (e.g., DL beam 202*a*, UL beam 202*b*). Further, the determination of which beam path to use is implicitly inferred based on the timing of the transmission of the messages. Accordingly, a typical initial access process does not assume interferences or MPE issues, as described above.

The present disclosure allows the UE 104 to communicate on different UL/DL beam paths by indicating a preferred beam path to use. Aspects of indicating a preferred beam path are now described in reference to FIGS. 2 and 3. In a first aspect, the UE 104 may indicate via the UE configuration message 308 (e.g., MSG3) a preferred DL beam for the base station 102 to transmit on, in response to an explicit request from the base station. In a second aspect, the UE 104 may indicate via the request message 304 (e.g., MSG1, RACH signal, and/or preamble) a preferred DL beam for the base station 102 to transmit on, without an explicit request from the base station. In each aspect, the preferred DL beam has a different beam path or beam direction as compared to the beam path or beam direction used by the UE 104 to transmit the request message 304 (e.g., MSG1 or a RACH signal).

According to the first aspect where the UE 104 signals a preferred DL beam path in response to an explicit request, the base station 102 may transmit and the UE 104 may receive the synch signal 302 on at least two of the DL beam 202*a*, the DL beam 204*a*, and/or the DL beam 206*a*. The UE 104 may determine that one of the received DL beams is the best DL beam, such as DL beam 202*a*. In response to the received synch signals 302, the UE 104 may generate the request message 304 and determine a preferred UL beam to communicate with the base station 102. In an example, the preferred UL beam may have a different direction than the best DL beam 202*a*, and may be determined based on interferences and/or MPE issues that may exist with the use of UL beams corresponding to the received DL beams, e.g., at least two of UL beams 202*b*, 204*b*, and/or 206*b*. For example, the UE 104 may include a sensor 820 (see FIG. 8), such as a proximity sensor or a touch sensor, to determine that a body part such as a hand, of the user of the UE 104 interferes with an antenna(s) of and/or a direction of the UL beam corresponding to the best DL beam 202*a* (and possibly one or more other ones of the directional UL beams 202*b*, 204*b*, and/or 206*b* corresponding to received ones of the DL beams) that may be transmitted by the UE 104, and may select a different directional UL beam, e.g., different from UL beam 202*b* corresponding to the best DL beam 202*a*, such as the UL beam 204*b*, as the preferred UL beam to avoid interference and/or reduce MPE to the user. As such, the preferred UL beam may be different (i.e., not a corresponding directional UL beam) from the DL beam on which the synch signal 302 was transmitted by the base station 102, received by the UE 104, and determined by the UE 104 to be the best beam. For simplicity, the preferred UL beam in this example will be referred to as preferred UL beam 204*b*. Once the preferred UL beam 204*b* is determined, the UE 104 may then transmit the request message 304 on the preferred UL beam 204*b*.

The base station 102 may receive the request message 304 and accept the connection request. The base station 102 may then respond to the request message 304 by transmitting the accept message 306*a* on the DL beam 204*a* corresponding to the preferred UL beam 204*b*, e.g., not on the best DL beam as determined by the UE 104. In an example, the accept message 306*a* may include information accepting the request message 304 from the UE 104 (e.g., RAR) and may also include a request for the UE 104 to send information indicating a preferred DL beam. Accordingly, the base station 102 may transmit the accept message 306*a* on the DL beam 204*a*.

Upon receiving the accept message 306*a*, the UE 104 may generate a UE configuration message 308 that includes information on a preferred DL beam (e.g., DL beam 206*a*) for the base station 102 to transmit data on. For example, the included information on the preferred DL beam may be one or more bits that identify a beam index, a beam identifier, or any other indication that identifies or corresponds to the preferred DL beam 206*a*. The UE 104 may determine the preferred DL beam based on the aspects previously described herein to determine the best DL beam (e.g., highest received signal strength, highest signal-to-noise ratio, etc.). In this example, the best DL beam may be determined by the UE 104 to be the preferred DL beam (e.g., DL beam 206*a*). The UE 104 may then transmit the UE configuration message 308 to the base station 102 on the preferred UL beam 204*b* and indicate the preferred DL beam 206*a* for use by the base station 102 for subsequent communications with the UE 104.

Based on the indication in the UE configuration message 308, the base station 102 may determine that the preferred DL beam is DL beam 206*a*. The base station 102 may then generate a base station configuration message 310 and transmit the base station configuration message 310 to the UE 104 on the preferred DL beam 206*a*. Accordingly, after the initial access process, the base station 102 and the UE 104 may communicate through the preferred UL beam 204*b* and the preferred DL beam 206*a*, which have different beam paths/directions, and where the preferred UL beam 204*b* may not be on the best path as determined by the UE 104, for instance, due to MPE issues.

According to the second aspect, the UE 104 may indicate to the base station 102 a preferred DL beam to transmit on without an explicit request. For example, the base station 102 may transmit and the UE 104 may receive the synch signal 302 on at least two of the DL beam 202*a*, the DL beam 204*a*, and/or the DL beam 206*a*. In response to the synch signal 302, the UE 104 may determine to communicate with the base station 102 via the preferred UL beam 204*b* and the preferred DL beam 206*a*, e.g., different directional UL and DL beams, in response to interference and/or MPE issues. The UE 104 may determine the preferred UL beam 204*b* and the preferred DL beam 206*a* according to aspects previously described herein (e.g., due to interference detection of sensor 820 as described above with respect to the first aspect). In this example, the preferred UL beam 204*b* may not be a corresponding UL beam for the preferred DL beam 206*a*, and also the preferred UL beam 204*b* may not be on the best UL beam path (e.g., UL beam 202*b*).

Next, in this second aspect, the UE 104 may generate the request message 304 to indicate the preferred DL beam 206*a*. In some examples, the UE 104 may select a preamble to indicate to the base station 102 the preferred DL beam 206*a*. As an example, the UE 104 may select the preamble having a preamble index that corresponds to the preferred DL beam 206*a*. For example, a first preamble may correspond to the DL beam 202*a*, a second preamble may correspond to the DL beam 204*a*, and a third preamble may correspond to the DL beam 206*a*. Accordingly, in this example, the UE 104 may select the third preamble to indicate to the base station 102 that the preferred DL beam is the DL beam 206*a*. In another example, the UE 104 may use a preamble frequency to indicate to the base station 102 the preferred DL beam 206*a*. For example, the UE 104 may select a preamble frequency location that corresponds to a DL transmit beam index of the DL beam 206*a*. Once the UE 104 generates the request message 304 including the selected preamble (or, alternatively, the selected preamble frequency location), the UE 104 may then transmit the request message 304 to the base station 102 on the preferred UL beam 204*b*.

The base station 102 may receive the request message 304 and accept the connection request. As the base station 102 does not know whether the preamble was randomly selected (according to typical initial access processes) or purposefully selected (according to aspects of the present disclosure), the base station 102 may initially respond to the request message 304 by transmitting the accept message 306*a* on the DL beam 204*a* corresponding to the preferred UL beam 204*b*. In other words, the base station 102 may initially assume that the preamble (e.g., the MSG1) came from a UE that randomly selected the preamble (according to typical initial access processes). If the base station 102 receives, within a predetermined time, the UE configuration message 308 in response to the accept message 306*a*, the base station 102 may then transmit the base station configuration message 310 on the DL beam 204*a*.

However, if the base station 102 does not receive the UE configuration message 308 within the predetermined time, the base station 102 may then assume that the preamble was purposefully selected, as described above, to indicate a preferred DL beam. Accordingly, the base station 102 may determine, based on the preamble of the preferred UL beam 204*b*, the preferred DL beam 206*a*. In an example, the base station 102 may be preconfigured to determine that the preamble indicates the preferred DL beam 206*a* based on the preamble index or the preamble frequency location. Once the preferred DL beam 206*a* is determined, the base station 102 may then transmit the accept message 306*b* on the preferred DL beam 206*a*. The base station 102 may then wait for the UE configuration message 308. If the UE configuration message 308 is not received within the predetermined time, the base station 102 may determine that the initial access procedure has failed and may then perform a failure procedure to clear out the failed initial access procedure and to re-initiate another initial access procedure. If the UE configuration message 308 is received within the predetermined time, the base station 102 may then transmit the base station configuration message 310 to the UE 104 on the preferred DL beam 206*a*.

Figure 4:
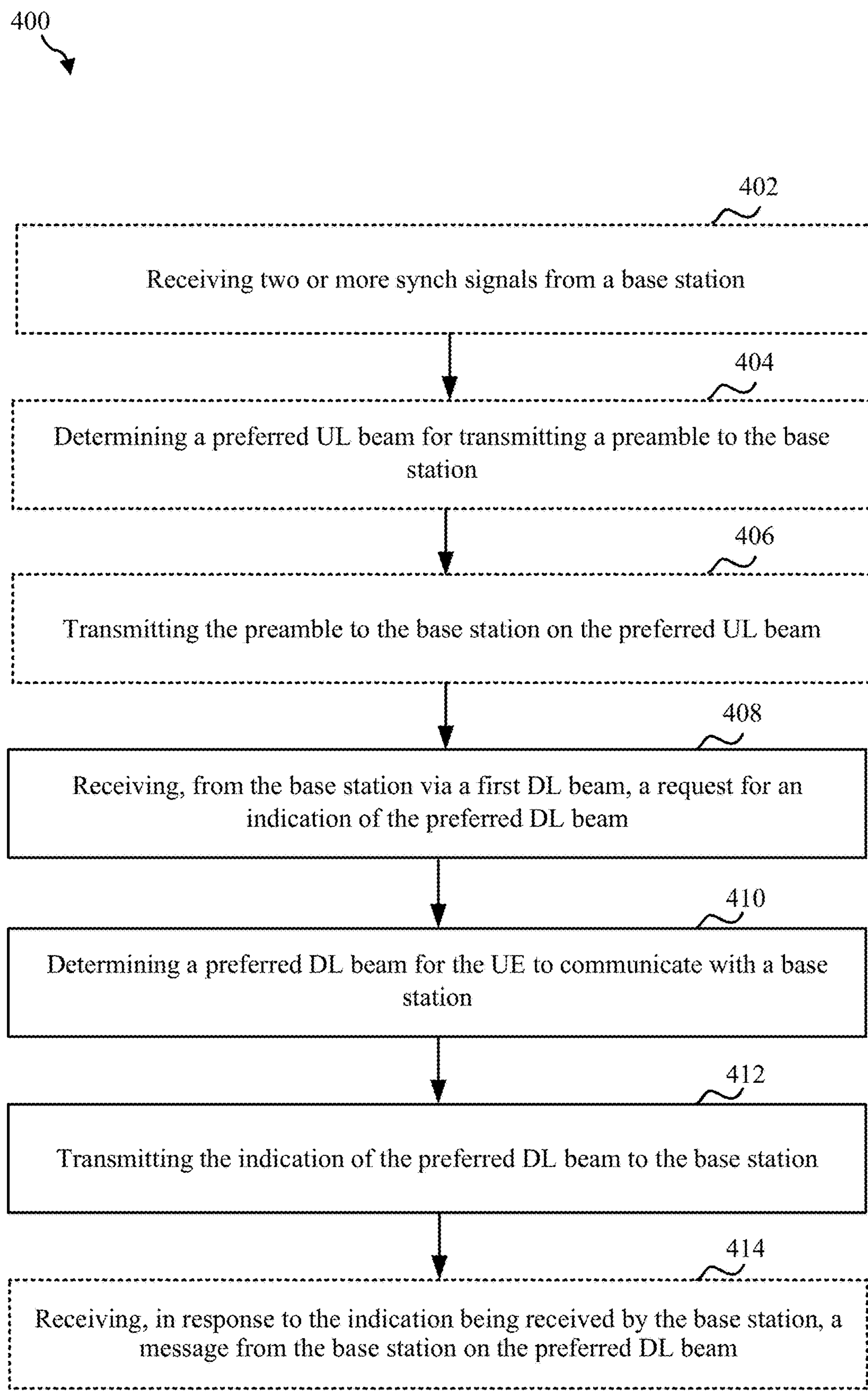
FIG. 4 is a flowchart of an example of a method of wireless communications for preforming an initial access procedure by a user equipment (UE) according to aspects of the present disclosure.

FIG. 4 includes an example of a method 400 of wireless communications by a UE. In an example, the UE may include the UE 104. The method 400 may correspond to the first aspect of the UE 104 indicating via the UE configuration message 308 (e.g., MSG3) a preferred DL beam for the base station 102 to transmit on, in response to an explicit request, as described herein.

At 402, the method 400 may optionally include receiving two or more synch signals from a base station. For example, the UE 104 may execute one or more of a processor 812, a modem 814, the initial access component 196, and/or a transceiver 802 to receive the synch signal 302 from the base station 102. In an example, two or more synch signals 302 may be received on two or more of the DL beams 202*a*, 204*a*, and/or 206*a*. In an example, the synch signals 302 may include synchronization information (e.g., connection time, frequency, beam, and channel, etc. associated with the base station 102) for the UE 104 to connect with the base station 102. Further, the synchronization information may include RACH configuration information.

At 404, the method 400 may optionally include determining a preferred UL beam for transmitting a preamble to the base station. For example, the UE 104 may execute one or more of a processor 812, a modem 814, the initial access component 196, and/or a transceiver 802 to determine a preferred UL beam for transmitting a preamble to the base station 102. For example, the UE 104 may include the sensor 820, such as a proximity sensor or a touch sensor, to determine an MPE issue and/or that a body part such as a hand, of the user of the UE 104 interferes with an antenna(s) and/or a path or direction of a best beam determined by the UE 104, and may select the UL beam 204*b* as the preferred UL beam to avoid interference and/or reduce MPE of the user.

At 406, the method 400 may optionally include transmitting the preamble to a base station on the preferred UL beam. For example, the UE 104 may execute one or more of a processor 812, a modem 814, the initial access component 196, and/or a transceiver 802 to transmit a preamble to the base station 102 on the preferred UL beam 204*b*. In an example, the preamble is transmitted via the request message 304. In some examples, the request message 304 may be a MSG1 of a RACH process. In some examples, the preferred UL beam (e.g., 204*b*) may not correspond to the best DL beam (e.g., 202*a*) on which the synch signal 302 was received by the UE 104. In an example, the preamble may be one of a number (e.g., 64) of sequences known by both the UE 104 and the base station 102.

At 408, the method 400 may include receiving, from a base station via a first downlink (DL) beam, a request for an indication of a preferred DL beam for the UE to communicate with the base station. For example, the UE 104 may execute one or more of the processor 812, the modem 814, the initial access component 196, and/or the transceiver 802 to receive, from the base station 102 via a first DL beam (e.g., DL beam 204*a*), a request for an indication of a preferred DL beam in the accept message 306*a* (e.g., RAR or MSG2). In some example, the UE 104 may receive the request from the base station 102 on the DL beam 204*a*, since this DL beam 204*a* corresponds (e.g., same path or direction) to the preferred UL beam 204*b* on which the request message 304 was transmitted.

At 410, the method 400 may include determining a preferred DL beam for the UE to communicate with the base station. For example, the UE 104 may execute one or more of the processor 812, the modem 814, and/or the initial access component 196, to determine the preferred DL beam 206*a* for the UE 104 to communicate with the base station 102. In an example, the UE 104 may determine the preferred DL beam 206*a* as the best beam of all the synch signal beams received by the UE 104, as explained in more detail above. In an example, the preferred DL beam 206*a* is not a corresponding DL beam of the preferred UL beam 204*b*, or, in other words, the preferred DL beam 206*a* and the preferred UL beam 204*b* have different beam paths or beam directions.

At 412, the method 400 may include transmitting the indication of the preferred DL beam to the base station. For example, the UE 104 may execute one or more of the processor 812, the modem 814, the initial access component 196, and/or the transceiver 802 to transmit the indication of the preferred DL beam 206*a* to the base station 102. In an example, the indication of the preferred DL beam 206*a*, which may be one or more bits that identify a beam index or identifier of the preferred DL beam 206*a*, may be transmitted in a UE configuration message 308 or MSG3 of the RACH process.

At 414, the method 400 may optionally include receiving, in response to the indication being received by the base station, a message from the base station on the preferred DL beam. For example, the UE 104 may execute one or more of the processor 812, the modem 814, the initial access component 196, and/or the transceiver 802 to receive, in response to the indication being received by the base station 102, a message (e.g., an acknowledgement) from the base station 102 on the preferred DL beam 206*a*. For example, the UE 104 may receive, from the base station 102 and on the DL beam 206*a*, a base station configuration message 310 and/or MSG4 acknowledgment of the indication.

Figure 5:
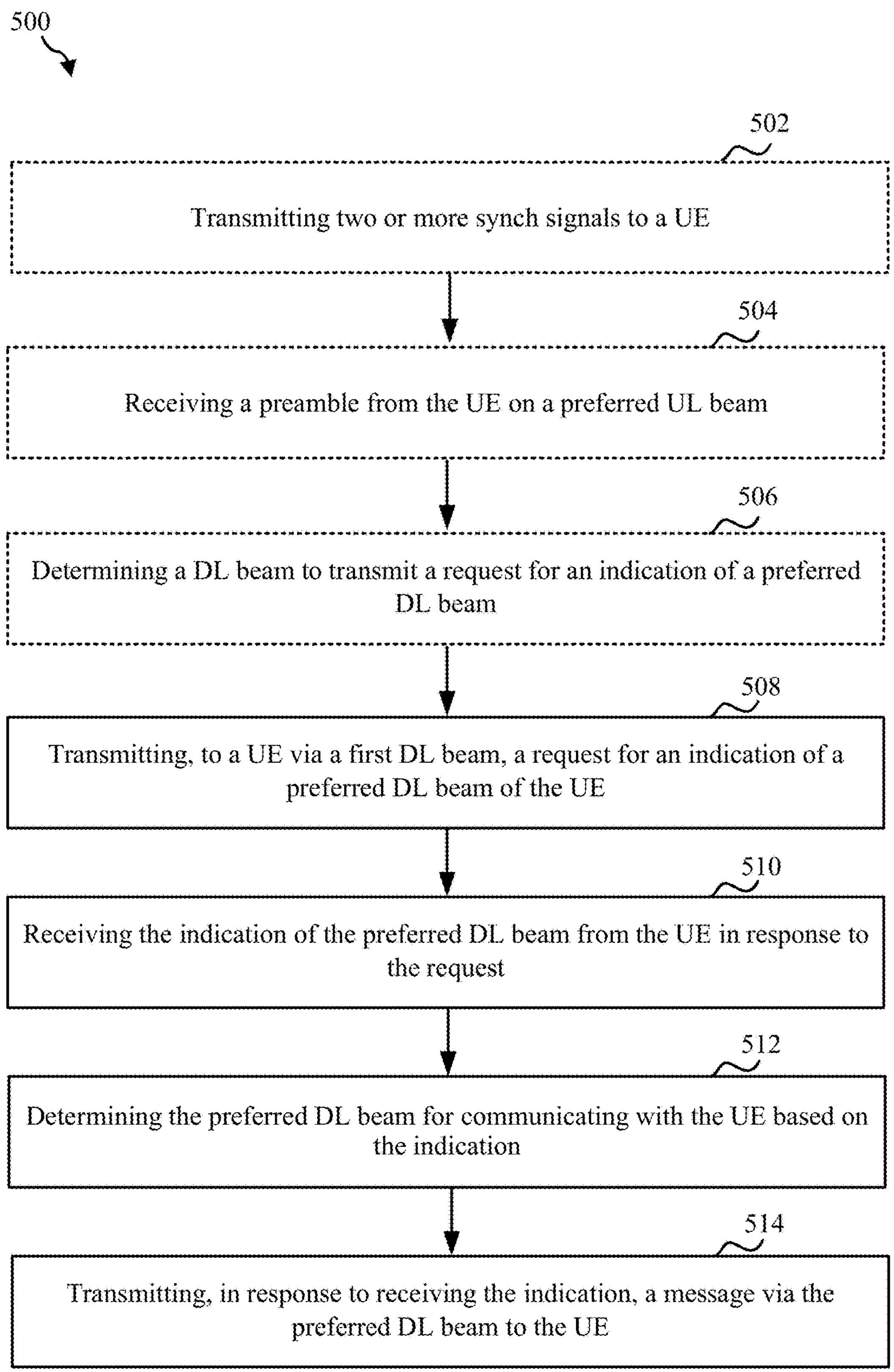
FIG. 5 is a flowchart of an example of a method of wireless communications for preforming an initial access procedure by a base station according to aspects of the present disclosure.

FIG. 5 is a flowchart of an example of a method 500 of wireless communications by a base station. The method 500 may be performed by the base station 102. The method 500 may correspond to the first aspect of the UE 104 indicating via the UE configuration message 308 (e.g., MSG3) a preferred DL beam for the base station 102 to transmit on, in response to an explicit request, as described herein.

At 502, the method 500 may optionally include transmitting two or more synch signals to a UE. For example, the base station 102 may execute one or more of a processor 912, a modem 914, the initial access component 198, and/or a transceiver 902 to transmit two or more synch signals 302 to the UE 104. In an example, the base station 102 may transmit two or more synch signals 302 on two or more DL beams 202*a*, 204*a*, and/or 206*a*. In an example, the synch signals 302 may include synchronization information (e.g., connection time, frequency, beam, and channel, etc. associated with the base station 102) for the UEs (e.g., UE 104) to connect with the base station 102. Further, the synchronization information may include RACH configuration information.

At 504, the method 500 may optionally include receiving a preamble from a UE via a preferred UL beam. For example, the base station 102 may execute one or more of the processor 912, the modem 914, the initial access component 198, and/or the transceiver 902 to receive a preamble from the UE 104 on the preferred UL beam 204*b*. The preamble may be in response to the synch signal 302 being transmitted. In an example, the preamble is received via the request message 304. In some examples, the request message 304 may be a MSG1 of a RACH process. In some examples, the preferred UL beam (e.g., 204*b*) may not correspond to the best DL beam (e.g., 202*a*) on which the synch signal 302 was received by the UE 104, as determined by the UE 104. In an example, the preamble may be one of a number (e.g., 64) of sequences known by both the UE 104 and the base station 102.

At 506, the method 500 may optionally include determining a DL beam to transmit a request for an indication of a preferred DL beam. For example, the base station 102 may execute one or more of the processor 912, the modem 914, the initial access component 198, and/or the transceiver 902 to determine the DL beam 204*a* for transmitting the request for an indication of a preferred DL beam. In an example, the base station 102 may determine the DL beam 204*a* based on the DL beam 204*a* corresponding to the preferred UL beam 204*b*, on which the preamble was received from the UE 104.

At 508, the method 500 may include transmitting, by the base station to a UE, a request for an indication of a preferred DL beam of the UE. For example, the base station 102 may execute one or more of the processor 912, the modem 914, the initial access component 198, and/or the transceiver 902 to transmit, by the base station 102 to the UE 104, a request for an indication of a preferred DL beam of the UE 104 in the accept message 306*a* (e.g., RAR or MSG2). In some example, the base station 102 may transmit the request on the DL beam 204*a*, since this DL beam 204*a* corresponds to the preferred UL beam 204*b* on which the request message 304 was received.

At 510, the method 500 may include receiving the indication of the preferred DL beam from the UE in response to the request. For example, the base station 102 may execute one or more of the processor 912, the modem 914, the initial access component 198, and/or the transceiver 902 to receive the indication of the preferred DL beam 206*a* from the UE 104 in response to the request in the accept message 306*a* (e.g., RAR or MSG2). In an example, the indication of the preferred DL beam 206*a*, which may be one or more bits corresponding to beam index or other beam identifier, may be received in a UE configuration message 308 or MSG3 of the RACH process.

512, the method 500 may include determining the preferred DL beam for communicating with the UE based on the indication, wherein the first DL beam is different from the preferred DL beam. For example, the base station 102 may execute one or more of the processor 912, the modem 914, the initial access component 198, and/or the transceiver 902 to determine the preferred DL beam 206*a* for communicating with the UE 104 based on an indication received in the UE configuration message 308, such as by decoding the information identifying the preferred DL beam 206*a*.

At 514, the method 500 may include transmitting, in response to receiving the information, a message via the preferred DL beam to the UE. For example, the base station 102 may execute one or more of the processor 912, the modem 914, the initial access component 198, and/or the transceiver 902 to transmit, in response to the information identifying the preferred DL beam 206*a* received in a UE configuration message 308, a base station configuration message 310 and/or MSG4 acknowledgment on the preferred DL beam 206*a*.

Figure 6:
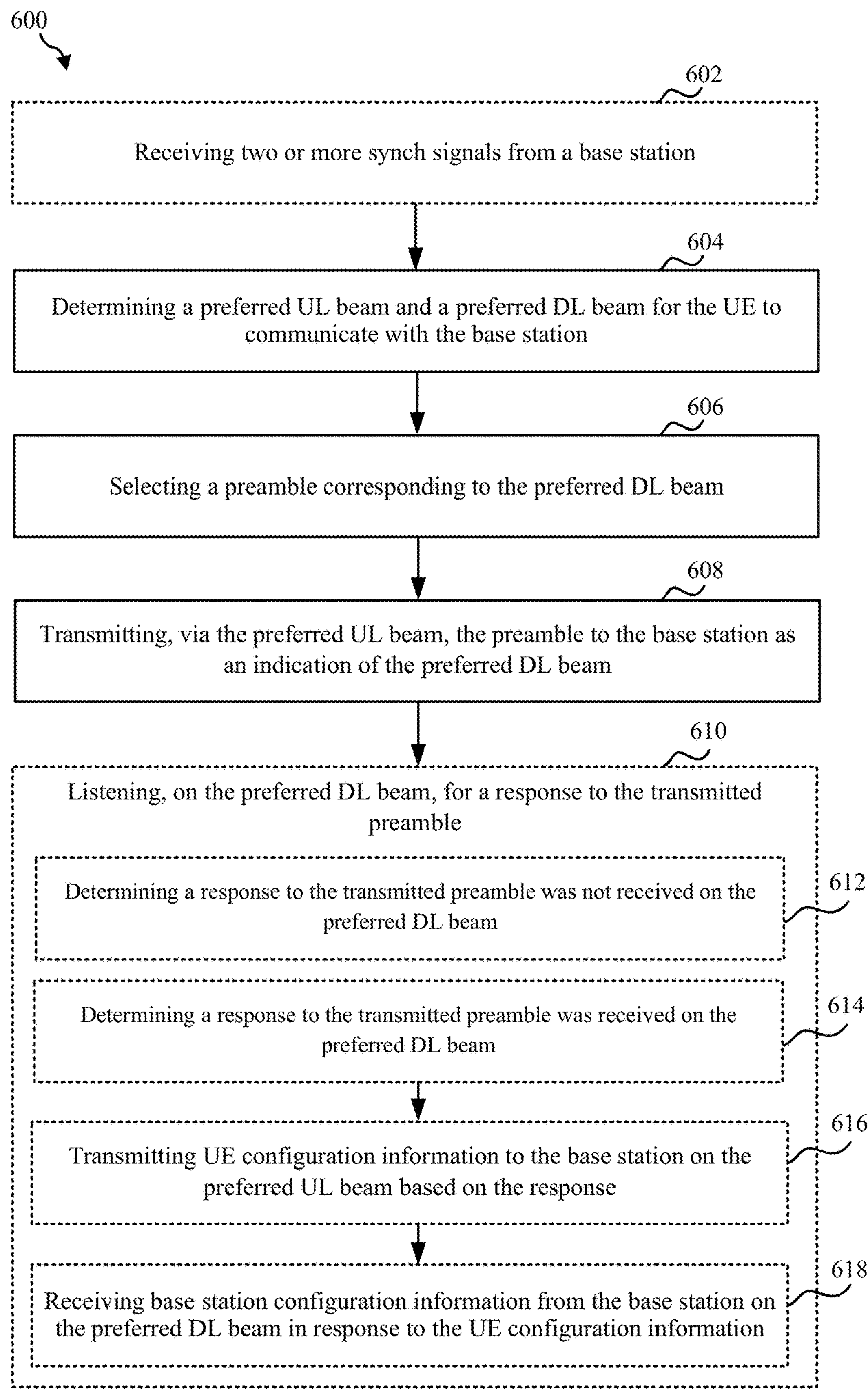
FIG. 6 is a flowchart of an example of a method of wireless communications for preforming an initial access procedure by a user equipment (UE) according to aspects of the present disclosure.

FIG. 6 includes an example of a method 600 of wireless communication by a UE. In an example, the UE may include the UE 104. The method 600 may correspond to the second aspect of the UE 104 indicating via the request message 304 (e.g., MSG1, RACH signal, and/or preamble) a preferred DL beam for the base station 102 to transmit on, without an explicit request, as described herein.

At 602, the method 600 may optionally include receiving two or more synch signals from a base station. For example, the UE 104 may execute one or more of a processor 812, a modem 814, the initial access component 196, and/or a transceiver 802 to receive the two or more synch signals 302 from the base station 102. In an example, two or more synch signals 302 may be received on two or more of the DL beams 202*a*, 204*a*, and/or 206*a*. In an example, each of the synch signals 302 may include synchronization information (e.g., connection time, frequency, beam, and channel, etc. associated with the base station 102) for the UE 104 to connect with the base station 102. Further, the synchronization information may include RACH configuration information.

At 604, the method 600 may include determining a preferred UL beam and a preferred DL beam for the UE to communicate with the base station. For example, the UE 104 may execute one or more of the processor 812, the modem 814, and/or the initial access component 196 to determine the preferred UL beam 204*b* and the preferred DL beam 206*a* for the UE 104 to communicate with the base station 102. In an example, the UE 104 may determine the preferred UL beam 204*b* and the preferred DL beam 206*a* based on interference and/or MPE issues, as described herein. In this example, the preferred UL beam 204*b* may not be a corresponding UL beam for the preferred DL beam 206*a* or, in other words, the preferred DL beam 206*a* and the preferred UL beam 204*b* have different beam paths or beam directions.

At 606, the method 600 may include selecting a preamble corresponding to the preferred DL beam. For example, the UE 104 may execute one or more of the processor 812, the modem 814, and/or the initial access component 196 to select a preamble corresponding to the preferred DL beam 206*a*. In an example, the preamble may be selected based on a preamble index that corresponds to the preferred DL beam 206*a*. For example, the preamble index may have a number (e.g., 64) of sequences known to both the UE 104 and the base station 102, and each of at least a subset of the preamble indexes may correspond to and/or identify a respective one of the DL beams. For example, a first preamble may correspond to the DL beam 202*a*, a second preamble may correspond to the DL beam 204*a*, and a third preamble may correspond to the DL beam 206*a*. Accordingly, in this example, the UE 104 may select the third preamble to indicate to the base station 102 that the preferred DL beam is the DL beam 206*a*. In another example, the preamble is selected based on a preamble frequency location that corresponds to the preferred DL beam 206*a*. For example, the UE 104 may select a preamble frequency location that corresponds to a DL transmit index of the DL beam 206*a*.

At 608, the method 600 may include transmitting, via the preferred UL beam, the preamble to the base station as an indication of the preferred DL beam. For example, the UE 104 may execute one or more of the processor 812, the modem 814, the initial access component 196, and/or the transceiver 802 to transmit, via the preferred UL beam 204*b*, the preamble (e.g., the selected one of the preambles or at the selected preamble frequency location) to the base station 102 via the request message 304 (e.g., MSG1, RACH signal) as an indication of the preferred DL beam 206*a*.

At 610, the method 600 may optionally include listening, on the preferred DL beam, for a response to the transmitted preamble. For example, the UE 104 may execute one or more of the processor 812, the modem 814, and/or the initial access component 196 to listen to a response to the transmitted preamble on the DL beam 206*a*.

At 612, the method 600 may optionally include determining a response to the transmitted preamble was not received on the preferred DL beam. For example, the UE 104 may execute one or more of the processor 812, the modem 814, and/or the initial access component 196 to determine a response to the transmitted preamble was not received on the preferred DL beam 206*a*. In this case, the initial access will fail and another initial access procedure will be performed.

At 614, the method 600 may optionally include determining a response to the transmitted preamble was received on the preferred DL beam. For example, the UE 104 may execute one or more of the processor 812, the modem 814, and/or the initial access component 196 to determine a response to the transmitted preamble was received on the preferred DL beam. In an example, the UE 104 may receive the accept message 306*b* on the preferred DL beam 206*a*. In an example, the accept message 306*b* may include information accepting the request message 304 from the UE 104 (e.g., RAR or MSG1). In an example, the accept message 306*b* may be a MSG2 of the RACH procedure.

At 616, the method 600 may optionally include transmitting UE configuration information to the base station on the preferred UL beam based on the response. For example, the UE 104 may execute one or more of the processor 812, the modem 814, the initial access component 196, and/or the transceiver 802 to transmit UE configuration information via the UE configuration message 308 (e.g., MSG3) on the preferred UL beam 204*b* to the base station 102 based on the accept message 306*b*.

At 618, the method 600 may optionally include receiving base station configuration information from the base station on the preferred DL beam in response to the UE configuration information. For example, the UE 104 may execute one or more of the processor 812, the modem 814, the initial access component 196, and/or the transceiver 802 to receive base station configuration information via the base station configuration message 310 (e.g., MSG4) on the preferred DL beam 206*a* from the base station 102 based on the UE configuration message 308.

Figure 7:
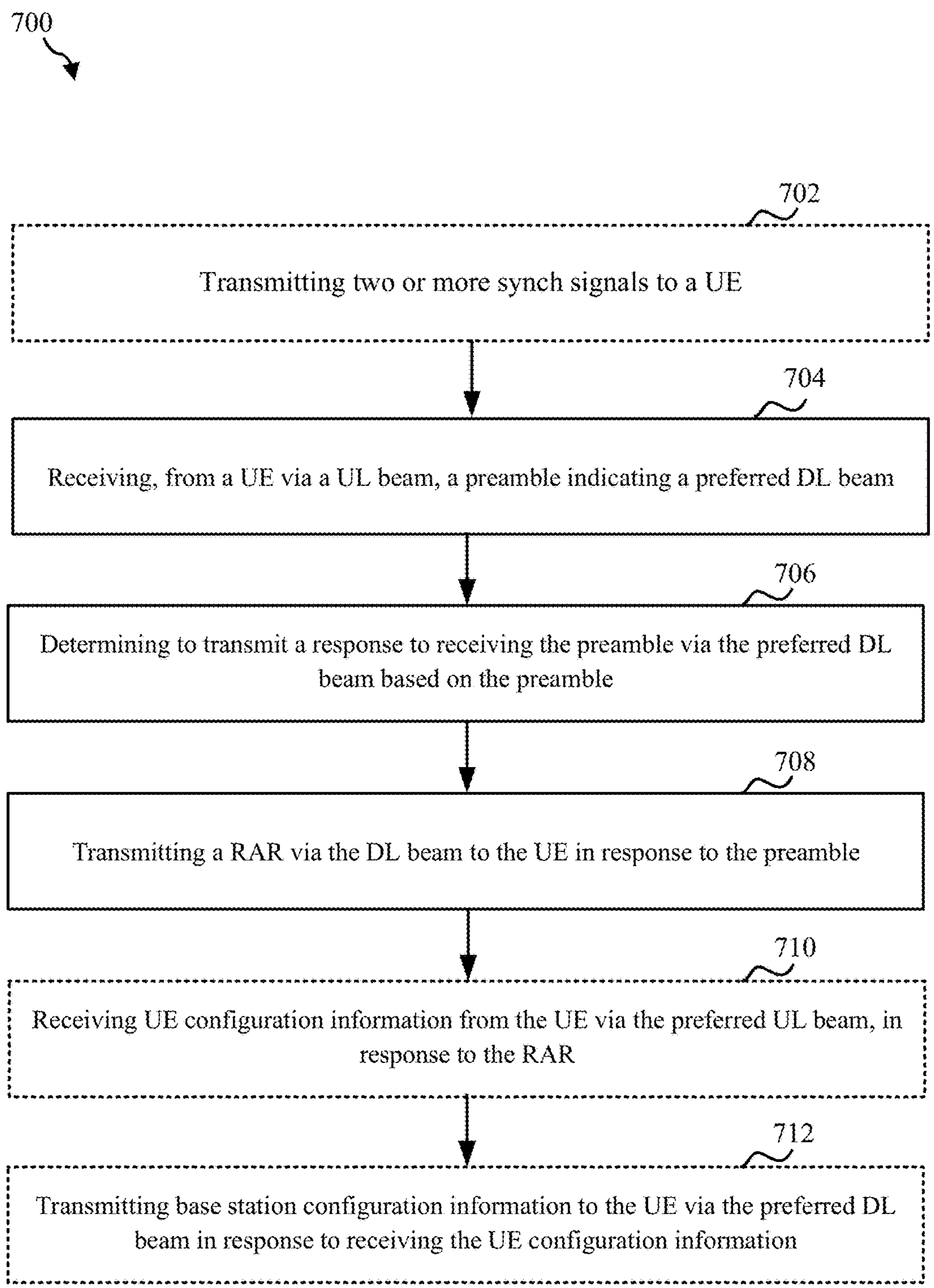
FIG. 7 is a flowchart of an example of a method of wireless communications for preforming an initial access procedure by a base station according to aspects of the present disclosure.

FIG. 7 is a flowchart of an example of a method 700 of wireless communications by a base station. The method 700 may be performed by the base station 102. The method 700 may correspond to the second aspect of the UE 104 indicating via the request message 304 (e.g., MSG1, RACH signal, and/or preamble) a preferred DL beam for the base station 102 to transmit on, without an explicit request, as described herein.

At 702, the method 700 may optionally include transmitting two or more synch signals to a UE. For example, the base station 102 may execute one or more of a processor 912, a modem 914, the initial access component 198, and/or a transceiver 902 to transmit two or more synch signals to the UE 104. In an example, the base station 102 may transmit the two or more synch signals 302 on two or more DL beams 202*a*, 204*a*, and/or 206*a*. In an example, the synch signal 302 may include synchronization information (e.g., connection time, frequency, beam, and channel, etc. associated with the base station 102) for the UEs (e.g., UE 104) to connect with the base station 102. Further, the synchronization information may include RACH configuration information.

At 704, the method 700 may include receiving, from a UE via a UL beam, a preamble indicating a preferred DL beam. For example, the base station 102 may execute one or more of the processor 912, the modem 914, the initial access component 198, and/or the transceiver 902 to receive, from the UE 104 on the UL beam 204*b*, a preamble via the request message 304 (e.g., MSG1, RACH signal) indicating the preferred DL beam 206*a*. In an example, the preamble may be based on a preamble index that corresponds to the preferred DL beam 206*a*, as described herein. In another example, the preamble is selected based on a preamble frequency location that corresponds to the preferred DL beam 206*a*, as described herein.

At 706, the method 700 may include determining to transmit a response to receiving the preamble via the preferred DL beam based on the preamble. For example, the base station 102 may execute one or more of the processor 912, the modem 914, the initial access component 198, and/or the transceiver 902 to determine, in response to the request message 304, to transmit a response to receiving the preamble via the preferred DL beam 206*a* based on the preamble. For example, the preferred DL beam may be determined based on a preamble index of the preamble. In another example, the preferred DL beam may be determined based on a preamble frequency location of the preamble.

In another example, the base station 102 may initially transmit the response via the DL beam 204*a* corresponding to the UL beam 204*b*, on which the preamble was received, for responding to the preamble. For example, as the base station 102 does not know whether the preamble was randomly selected (according to typical initial access processes) or purposefully selected (according to aspects of the present disclosure), the base station 102 may initially select the DL beam 204*a* corresponding to the preferred UL beam 204*b* to transmit an initial RAR. However, if the base station 102 does not receive a UE configuration message 308 (e.g., MSG3) within a predetermined time after the initial RAR is transmitted, the base station 102 may then assume that the preamble was purposefully selected, and select to transmit the RAR, based on the preamble of the preferred UL beam 204*b*, via the preferred DL beam 206*a*.

At 708, the method 700 may include transmitting a RAR via the DL beam to the UE in response to the preamble. For example, the base station 102 may execute one or more of the processor 912, the modem 914, the initial access component 198, and/or the transceiver 902 to transmit a RAR via the accept message 306*a* (e.g., MSG2) on the DL beam 204*a* to the UE 104 in response to the preamble. Alternatively, as described herein, the base station 102 may transmit (or retransmit) the RAR via the accept message 306*b* (e.g., MSG2) on the DL beam 206*a* to the UE 104 in response to the preamble when the base station 102 does not receive a UE configuration message 308 (e.g., MSG3) within a predetermined time.

At 710, the method 700 may optionally include receiving UE configuration information from the UE via the preferred UL beam, in response to the RAR. For example, the base station 102 may execute one or more of the processor 912, the modem 914, and/or the initial access component 198 to receive UE configuration information via the UE configuration message 308 (e.g., MSG3) from the UE via the preferred UL beam 204*b*, in response to the RAR.

At 712, the method 700 may optionally include transmitting base station configuration information to the UE via the preferred DL beam in response to receiving the UE configuration information. For example, the base station 102 may execute one or more of the processor 912, the modem 914, and/or the initial access component 198 to transmit base station configuration information in the base station configuration message 310 (e.g., MSG4) to the UE via the preferred DL beam 206*a* in response to receiving the UE configuration information.

Figure 8:
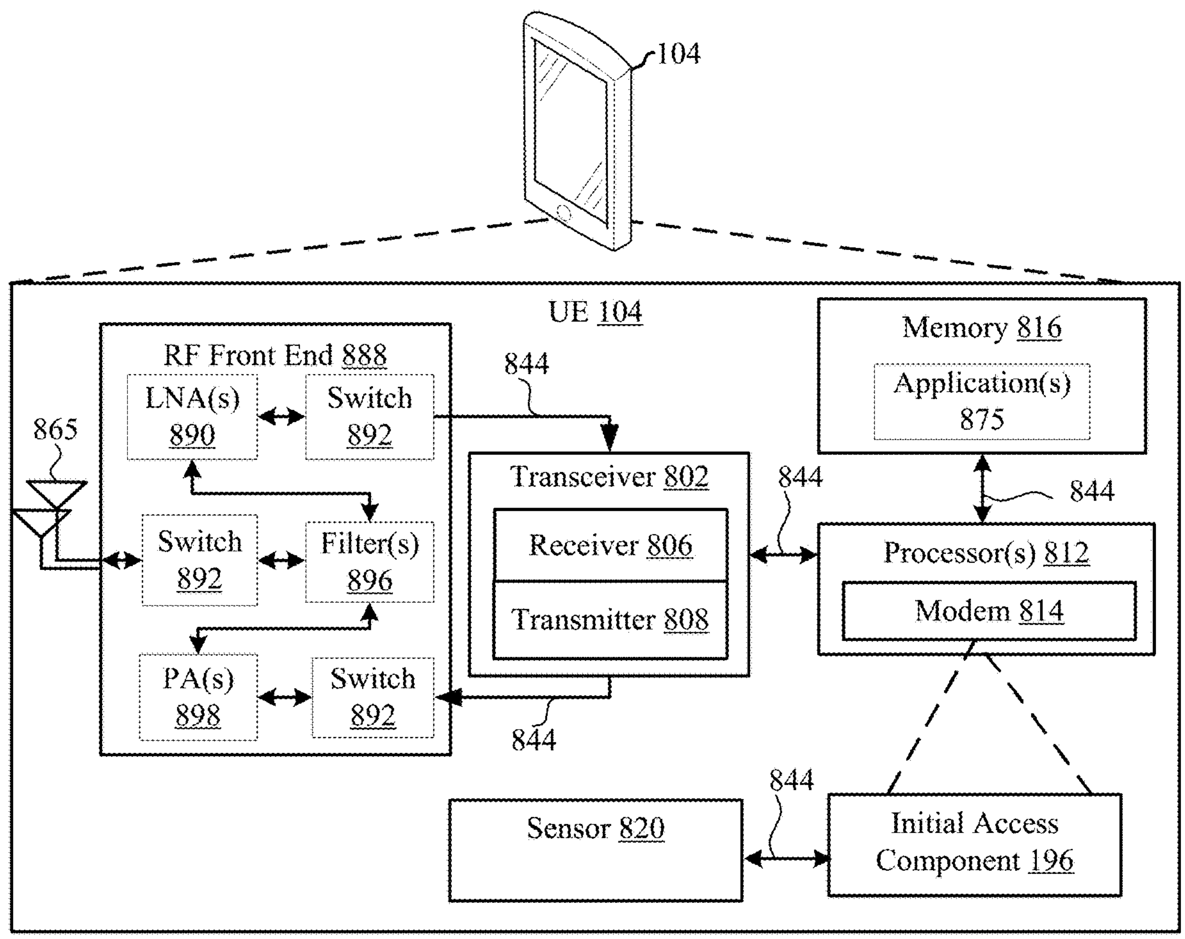
FIG. 8 is a block diagram of an example of a hardware implementation of a UE having an initial access component according to aspects of the present disclosure.

Referring to FIG. 8, one example of an implementation of the UE 104 having decoupling UL/DL initial access technologies may include a variety of components, some of which have already been described above, but including components such as one or more processors 812, memory 816, and transceiver 802 in communication via one or more buses 844, which may operate in conjunction with the UE 104 to enable one or more of the functions described herein related to decoupling UL/DL initial access.

In an aspect, the one or more processors 812 can include a modem 814 that uses one or more modem processors. The various functions related to the UE 104 may be included in the modem 140 and/or the one or more processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or the modem 140 associated with the initial access component 196 may be performed by the transceiver 802.

Also, the memory 816 may be configured to store data used herein and/or local versions of applications 875 or the initial access component 196 and/or one or more of its subcomponents being executed by the one or more processors 812. The memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, the memory 816 may be a non-transitory computer-readable storage medium that stores one or more computer-executable codes defining the initial access component 196 and/or one or more of its subcomponents, and/or data associated therewith, when the initial access component 196 is operating the one or more processors 812 to execute the initial access component 196 and/or one or more of its subcomponents.

Transceiver 802 may include at least one receiver 806 and at least one transmitter 808. The receiver 806 may include hardware, firmware, and/or software code executable by a processor for receiving data, the code comprising instructions and being stored in a memory (e.g., computer-readable medium). The receiver 806 may be, for example, a radio frequency (RF) receiver. In an aspect, the receiver 806 may receive signals transmitted by at least one base station 102 or another UE. Additionally, the receiver 806 may process such received signals, and also may obtain measurements of the signals, such as, but not limited to, Ec/Io, SNR, RSRP, RSSI, etc. The transmitter 808 may include hardware, firmware, and/or software code executable by a processor for transmitting data, the code comprising instructions and being stored in a memory (e.g., computer-readable medium). A suitable example of the transmitter 808 may include an RF transmitter.

Moreover, in an aspect, the UE 104 may include an RF front end 888, which may operate in communication with one or more antennas 865 and the transceiver 802 for receiving and transmitting radio transmissions, for example, wireless communications transmitted by at least one base station 102 or another UE. The RF front end 888 may be connected to the one or more antennas 865 and can include one or more low-noise amplifiers (LNAs) 890, one or more switches 892, one or more power amplifiers (PAs) 898, and one or more filters 896 for transmitting and receiving RF signals.

In an aspect, the one or more LNAs 890 can amplify a received signal at a desired output level. In an aspect, each of the one or more LNAs 890 may have a specified minimum and maximum gain values. In an aspect, the RF front end 888 may use one or more switches 892 to select a particular one of the one or more LNAs 890 and its specified gain value based on a desired gain value for a particular application.

Further, for example, the one or more PA(s) 898 may be used by the RF front end 888 to amplify a signal for an RF output at a desired output power level. In an aspect, each of the one or more PAs 898 may have specified minimum and maximum gain values. In an aspect, the RF front end 888 may use the one or more switches 892 to select a particular one of the one or more PAs 898 and its specified gain value based on a desired gain value for a particular application.

Also, for example, the one or more filters 896 can be used by the RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, the RF front end 888 can use the one or more switches 892 to select a transmit or receive path using a specified filter 896, LNA 890, and/or PA 898, based on a configuration as specified by transceiver 802 and/or the one or more processors 812.

As such, the transceiver 802 may be configured to transmit and receive wireless signals through the one or more antennas 865 via the RF front end 888. In an aspect, the transceiver 802 may be tuned to operate at specified frequencies such that the UE 104 can communicate with, for example, one or more of the base stations 102 or another UE or one or more cells associated with one or more base stations 102. In an aspect, for example, the modem 140 can configure the transceiver 802 to operate at a specified frequency and power level based on the vehicle configuration of the UE 104 and the communication protocol used by the modem 140.

In an aspect, the modem 140 can be a multiband-multimode modem, which can process digital data and communicate with the transceiver 802 such that the digital data is sent and received using the transceiver 802. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 104 (e.g., RF front end 888, transceiver 802) to enable transmission and/or reception of signals from the network based on a specified modem configuration. In an aspect, the modem configuration can be based on the mode of the modem 140 and the frequency band in use. In another aspect, the modem configuration can be based on UE configuration information associated with vehicle 200 as provided by the network during cell selection and/or cell reselection.

Figure 9:
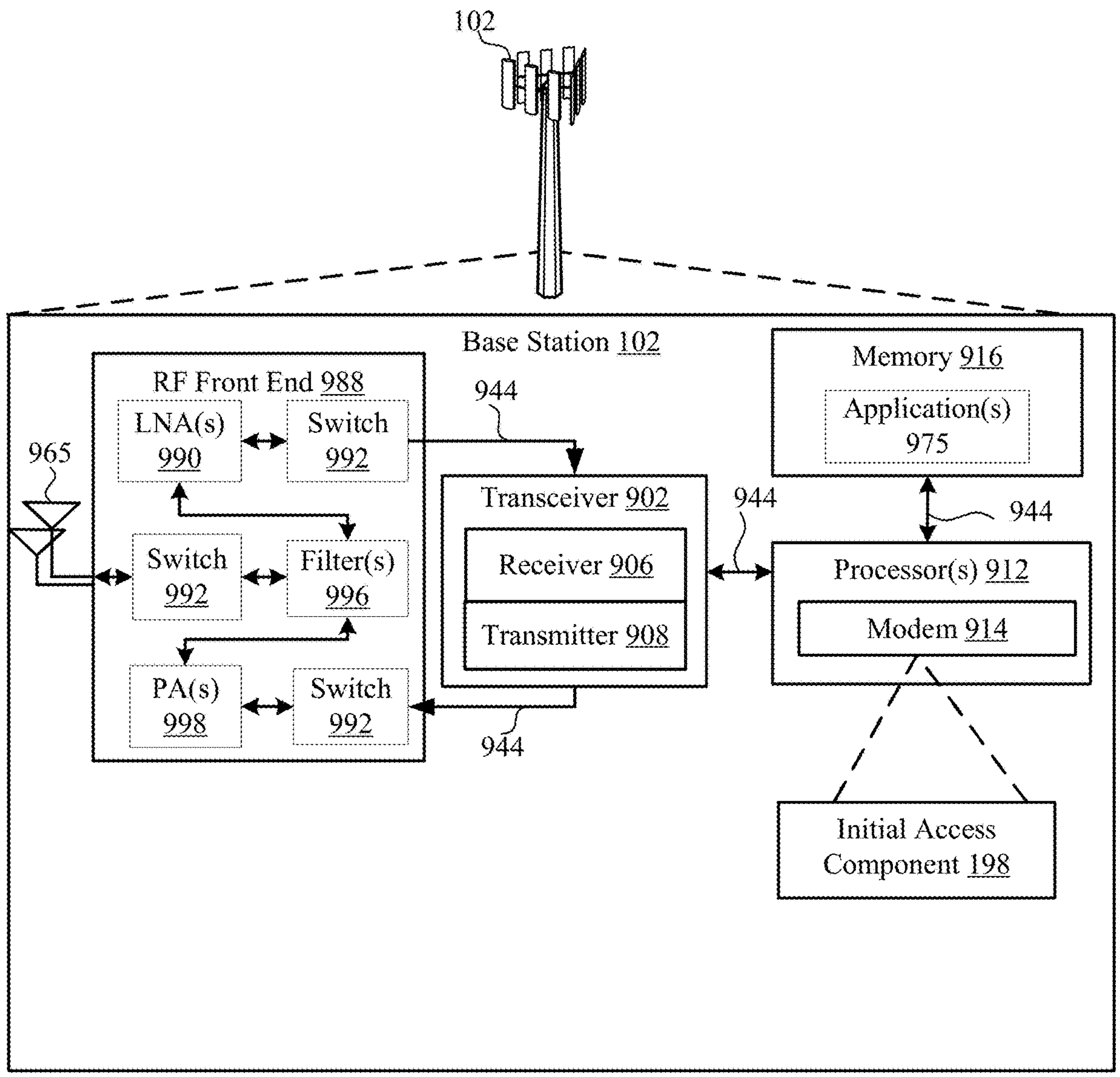
FIG. 9 is a block diagram of an example of a hardware implementation of a base station having an initial access component according to aspects of the present disclosure.

Referring to FIG. 9, one example of an implementation of base station 102 may include a variety of components, some of which have already been described above, but including components such as one or more processors 912 and memory 916 and transceiver 902 in communication via one or more buses 944, which may operate in conjunction with modem 160 and the initial access component 198 to enable one or more of the functions described herein related to decoupling UL/DL initial access.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of the UE 104, as described above, but configured or otherwise programmed for base station operations as opposed to UE operations.

Some Further Example Implementations

An example method of wireless communications by a user equipment (UE), comprising: receiving, from a base station via a first downlink (DL) beam, a request for an indication of a preferred DL beam for the UE to communicate with the base station; determining the preferred DL beam for the UE to communicate with the base station, wherein the preferred DL beam is different from the first DL beam; and transmitting the indication of the preferred DL beam to the base station.

The above example method, wherein the request is received in a Random Access Channel (RACH) Accept Response (RAR).

One or more of the above example methods, further comprising: transmitting a preamble to the base station on a preferred uplink (UL) beam, wherein the first DL beam corresponds to the preferred UL beam.

One or more of the above example methods, further comprising: receiving, from a sensor, information of interference or Maximum Permissible Exposure (MPE) of radiation to one or more UL beams or DL beams; and determining one or more of the preferred UL beam or the preferred DL beam based on the information.

One or more of the above example methods, wherein the preferred DL beam is different from the preferred UL beam.

One or more of the above example methods, further comprising: receiving, in response to the transmitting the indication, a message from the base station on the preferred DL beam.

One or more of the above example methods, wherein the message includes base station configuration information.

An example method of wireless communications by a base station, comprising: transmitting, to a user equipment (UE) via a first downlink (DL) beam, a request for information corresponding to a preferred DL beam of the UE; receiving the information corresponding to the preferred DL beam from the UE in response to the request; determining the preferred DL beam for communicating with the UE based on the information, wherein the first DL beam is different from the preferred DL beam; and transmitting, in response to receiving the indication, a message via the preferred DL beam to the UE.

The above example method, further comprising: receiving a preamble from the UE via a preferred uplink (UL) beam, wherein the request for the indication is in response to receiving the preamble.

One or more of the above example methods, wherein the first DL beam corresponds to the preferred UL beam.

One or more of the above example methods, wherein the message includes base station configuration information.

One or more of the above example methods, wherein the request for the information is transmitted in a Random Access Channel (RACH) Accept Response (RAR).

An example method of wireless communications by a user equipment (UE), comprising: determining a preferred uplink (UL) beam and a preferred downlink (DL) beam for the UE to communicate with a base station, wherein the preferred UL beam is different from the preferred DL beam; selecting a preamble corresponding to the preferred DL beam; and transmitting, via the preferred UL beam, the preamble to the base station as an indication of the preferred DL beam.

The above example method, wherein the preferred UL beam and the preferred DL beam are determined based on an interference or a Maximum Permissible Exposure (MPE) of radiation by the UE.

One or more of the above example methods, wherein the preamble is selected based on a preamble index that corresponds to the preferred DL beam.

One or more of the above example methods, wherein the preamble is selected based on a preamble frequency that corresponds to the preferred DL beam.

One or more of the above example methods, further comprising: listening for a response to the preamble on the preferred DL beam; and transmitting UE configuration information to the base station based on reception of the response.

One or more of the above example methods, further comprising: determining a response to the preamble was not received on the preferred DL beam; and terminating communications with the base station based on the non-reception of the response.

One or more of the above example methods, further comprising: determining a response to the preamble was received on the preferred DL beam; and transmitting UE configuration information to the base station based on the reception of the response.

One or more of the above example methods, further comprising: receiving base station configuration information from the base station on the preferred DL beam in response to the UE configuration information.

An example method of wireless communications by a base station, comprising: receiving, from a user equipment (UE) via an uplink (UL) beam, a preamble indicating a preferred downlink (DL) beam, wherein the UL beam is different from the preferred DL beam; determining to transmit a response to receiving the preamble via the preferred DL beam based on the preamble; and transmitting a Random Access Channel (RACH) Accept Response (RAR) via the preferred DL beam to the UE.

The above example method, wherein the preferred DL beam is determined based on a preamble index of the preamble.

One or more of the above example methods, wherein the preferred DL beam is determined based on a preamble frequency of the preamble.

One or more of the above example methods, wherein determining to transmit the response to receiving the preamble comprises: transmitting an initial RAR to the UE via a DL beam corresponding to the UL beam on which the preamble was received; determining a response to the initial RAR on the DL beam within a time period; and determining to transmit the response to receiving the preamble via the preferred DL beam after the time period.

One or more of the above example methods, further comprising: receiving UE configuration information from the UE via the preferred UL beam, in response to the RAR.

One or more of the above example methods, further comprising: transmitting base station configuration information to the UE via the preferred DL beam in response to receiving the UE configuration information.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a user equipment (UE), comprising:

transmitting a preamble to a base station on a first uplink (UL) beam, wherein the first UL beam is a UL beam preferred by the UE;

receiving, from the base station via a first downlink (DL) beam, a request for an indication of a second DL beam for the UE to communicate with the base station, wherein the request for the indication is received in response to transmitting the preamble to the base station and the first DL beam corresponds to the first UL beam;

determining the second DL beam for the UE to communicate with the base station, wherein the second DL beam is different from the first DL beam;

transmitting, to the base station via a first uplink (UL) beam, the indication of the second DL beam to the base station; and receiving, from the base station, a message via the second DL beam, in response to the indication of the second DL beam being transmitted.

2. The method of claim 1, wherein the request is received in a Random Access Channel (RACH) Accept Response (RAR).

3. The method of claim 1, further comprising:

receiving, from a sensor of the UE, information of interference or Maximum Permissible Exposure (MPE) of radiation to one or more UL beams or DL beams; and determining to communicate with the base station with one or more of the first UL beam or the second DL beam based on the information.

4. The method of claim 1, wherein the second DL beam does not correspond to the first UL beam.

5. The method of claim 1, wherein the message includes base station configuration information.

6. The method of claim 1, wherein a first received signal strength of the first DL beam is greater than a second received signal strength of the second DL beam, or first signal-to-noise ratio of the first DL beam is greater than a second signal-to-noise ratio of the second DL beam.

7. A user equipment (UE), comprising:

a memory storing instructions; and one or more processors coupled with the memory and configured to:

transmit a preamble to a base station on a first uplink (UL) beam, wherein the first UL beam is a UL beam preferred by the UE, receive, from the base station via a first downlink (DL) beam, a request for an indication of a second DL beam for the UE to communicate with the base station, wherein the request for the indication is received in response to transmitting the preamble to the base station and the first DL beam corresponds to the first UL beam;

determine the second DL beam for the UE to communicate with the base station, wherein the second DL beam is different from the first DL beam;

transmit, to the base station via a first uplink (UL) beam, the indication of the second DL beam to the base station; and receive, from the base station, a message via the second DL beam, in response to the indication of the second DL beam being transmitted.

8. The UE of claim 7, wherein the request is received in a Random Access Channel (RACH) Accept Response (RAR).

9. The UE of claim 7, wherein the one or more processors is further configured to:

receive, from a sensor coupled with the one or more processors, information of interference or Maximum Permissible Exposure (MPE) of radiation to one or more UL beams or DL beams; and determine to communicate with the base station with one or more of the first UL beam or the second DL beam based on the information.

10. The UE of claim 7, wherein the second DL beam does not correspond to the first UL beam.

11. The UE of claim 7, wherein the message includes base station configuration information.

12. The UE of claim 7, wherein a first received signal strength of the first DL beam is greater than a second received signal strength of the second DL beam, or first signal-to-noise ratio of the first DL beam is greater than a second signal-to-noise ratio of the second DL beam.

13. A computer-readable medium storing computer executable code for one or more processors of a user equipment (UE), comprising code to:

transmit a preamble to a base station on a first uplink (UL) beam, wherein the first UL beam is a UL beam preferred by the UE;

receive, from the base station via a first downlink (DL) beam, a request for an indication of a second DL beam for the UE to communicate with the base station, wherein the request for the indication is received in response to transmitting the preamble to the base station and the first DL beam corresponds to the first UL beam;

determine the second DL beam for the UE to communicate with the base station, wherein the second DL beam is different from the first DL beam;

transmit, to the base station via a first uplink (UL) beam, the indication of the second DL beam to the base station; and receive, from the base station, a message via the second DL beam, in response to the indication of the second DL beam being transmitted.

14. The computer-readable medium of claim 13, wherein the request is received in a Random Access Channel (RACH) Accept Response (RAR).

15. The computer-readable medium of claim 13, further comprising code to:

receive, from a sensor coupled with the UE, information of interference or Maximum Permissible Exposure (MPE) of radiation to one or more UL beams or DL beams; and determine to communicate with the base station with one or more of the first UL beam or the second DL beam based on the information.

16. The computer-readable medium of claim 13, wherein the second DL beam does not correspond to the first UL beam.

17. The computer-readable medium of claim 13, wherein the message includes base station configuration information.

18. The computer-readable medium of claim 13, wherein a first received signal strength of the first DL beam is greater than a second received signal strength of the second DL beam, or first signal-to-noise ratio of the first DL beam is greater than a second signal-to-noise ratio of the second DL beam.

* * * * *